Nov. 21, 1967   A. MARINI, SR   3,353,833
COLLET RELEASE
Filed Sept. 24, 1965
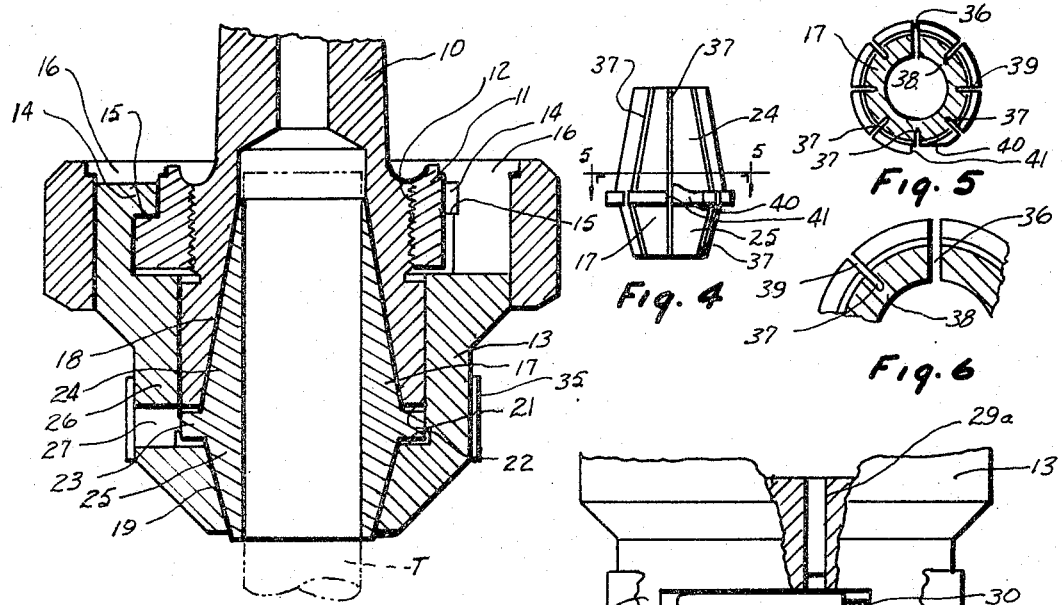
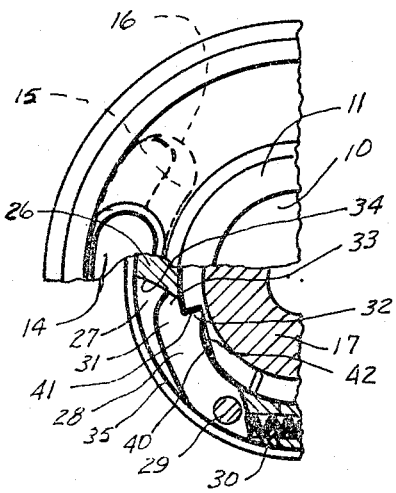
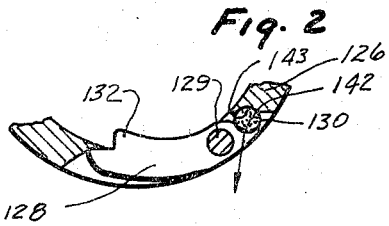
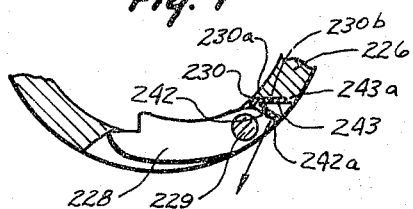
Albert Marini, Sr. INVENTOR
BY George E. Szekely
Agent

United States Patent Office 3,353,833
Patented Nov. 21, 1967

3,353,833
COLLET RELEASE
Albert Marini, Sr., Racine, Wis., assignor to Albert Marini and Florence Marini, co-partners, doing business as Marini Tool and Die Company, Racine, Wis.
Filed Sept. 24, 1965, Ser. No. 489,828
21 Claims. (Cl. 279—49)

My invention relates to an improvement in tool holders or adapters of the type employing a split, externally tapered collet to grip a tool shank upon wedging of the collet in a conical recess of the holder.

My invention is particularly intended for use in a holder or adapter of the type accommodating a straight tool shank, the holder or adapter being designed for driving connection to a machine tool spindle or chuck, such as that of a milling machine, for example. Quick action is a highly desirable feature of such holders or adapters. To accomplish quick tool changes, holders or adapters are generally designed to grip or release a tool by a rapid manipulation of a nut, cam-ring, or the like, without removing the collet or other part from the holder. In order to develop maximum grip with minimum thrust, collets are preferably made with a "slow" taper, usually less than 15°. Such tapers are self-locking; that is, when the collet is wedged under substantial thrust, release of the thrust may not release the contractive force due to the wedging action of the collet taper. In such case, the tool cannot be withdrawn, unless the holder or adapter be dismantled, perhaps removed from the machine, defeating an important purpose of the unit, or unless an auxiliary release, draw or knockout be provided.

Various means for releasing collets have been heretofore proposed. For example, it has been proposed to use a draw ring bearing on the collet taper. However, such devices are objectionable in that the draw ring itself may become wedged to the collet, requiring an additional manipulation to free the ring, before inserting the new tool. It has also been proposed to provide a draw ring carried by a clamping nut and engaging a groove or flange of the collet. Such devices involve substantial relative rotation of the nut or other part engaging or bearing on the collet, with consequent risk of galling, unless complex and expensive follower bearing structures are employed. Cam action releases inevitably involve complex and expensive structure and unduly complicate the collet, particularly because of variations in collet seating position necessarily involved with commercial variation in tool shanks. Impact or highly forcible knockouts impose a serious hazard of damage to the collet or other precision parts of the holder or adapter.

It is an object of my invention to provide a release for split, tapered collets which may be simply and inexpensively incorporated in a tool holder, adapter or the like.

It is a further object of my invention to provide a collet release which is actuable by minimum manipulative motion of associated parts.

It is a still further object of my invention to provide a collet release particularly suitable to quick-acting holders or adapters, operable without substantial variation in the mode or time of manipulation required to change tools.

Yet another object of my invention is to provide a collet release which is dependably operable without risk of damage to the collet or other parts of a holder or adapter in which such release is incorporated.

An additional object of my invention is to provide a collet release of simple, compact and sturdy construction, which does not require a substantial enlargement of, or protrusion from, a holder or adapter in which such release is incorporated.

A still further object of my invention is the provision, in association with a release mechanism, of a split collet having a portion actuable by a release pawl without substantial strain of the collet, yet having contractile characteristics substantially unimpaired by the incorporation of such portion.

The foregoing and other objects and advantages of my novel collet release and collet will be more readily understood from the ensuing description and accompanying drawings, in which:

FIGURE 1 is a longitudinal section through a tool adapter, showing the parts assembled with my novel collet in its gripping position;

FIGURE 2 is a partial elevation of the collet cage shown in FIG. 1, with the cover ring broken away to show the position of the release mechanism in the cage wall;

FIGURE 3 is a partial plan view of the adapter shown in FIG. 1, with a portion broken away to show my novel release and collet arrangement in position to effect release;

FIGURE 4 is an elevation of the collet, showing the scoring and slitting thereof;

FIGURE 5 is a section on line 5—5 of FIG. 4;

FIGURE 6 is an enlarged fragmentary section, similar to FIG. 5, showing scoring and slitting details;

FIGURES 7 and 8 are fragmentary sections through the wall of a collet cage, showing modified forms of my novel release.

The adapter shown in FIGS. 1–3 inclusive is substantially the same as that shown and described in my U.S. Patent No. 3,026,116, for "Quick-Change Tool Adapter," issued March 20, 1962, except insofar as modified to accommodate my novel collet and release. Construction and operation of the adapter not involved with release operation are not herein described, but may be ascertained from the above identified patent. It should be understood that the particular adapter is here shown by way of illustration only, the release not being limited in application to that adapter, but being adaptable to other forms of adapters or holders, as will be apparent to those skilled in the art from reading the description and drawings.

Referring now to FIG. 1, numeral 10 indicates a shank adapted to engage a machine tool spindle, carrying a clamp ring 11, which may be travelled longitudinally of shank 10, in this case by means of threads 12. Ring 11 carries collet cage 13 for longitudinal travel with the ring, a plurality of lugs 14, protruding from cage 13, overlying shoulders 15, which subtend portions of arcuate slots 16. As best seen in FIG. 3, slots 16 are of greater arcuate extent than lugs 14, permitting limited relative rotation of cage 13 and ring 11, while longitudinally engaged as in FIG. 1, after backing off ring 11 to relieve clamping pressure.

Collet 17 is interposed between shank 10 and cage 13, in position for wedging engagement with the shank bore along conical interface 18. Collet 17 is split and scored, as hereinafter described, so that when ring 11 draws cage 13 toward shank 10, the wedging action at interface 18 contracts the collet to grip a tool shank T. In order to insure the greatest possible resistance to slip between a shank T and the adapter or holder, the taper angle of interface 18 relative to the axis is preferably quite small, on the order of 15° or less. I have found a 10° taper best suited for usual applications of an adapter such as that shown. Tapers of such degree are self-locking, so that when collet 17 is fully drawn along interface 18 to grip a tool T, the grip may be fully retained, even though clamping pressure is released by backing off ring 11. In such case tool T cannot be readily withdrawn. Furthermore, I find that a double-taper collet is specially advantageous for heavy duty work, collet 17 having a self-locking nose taper engaged with cage 13 at interface 19. With this arrangement, it may frequently occur that the entire assembly is locked, so that cage 13 cannot readily be removed for access to the collet, to free or change same, as occasion may require. My novel release is directed to obviating such difficulties.

When shank 10 and cage 13 are in the collet-clamping position shown, shank nose face 21 and cage flange face 22 define an annular space for reception of an external lug portion or collar 23 of collet 17, lying between skirt 24 and nose 25. The distance between faces 21 and 22 at mean takeup is slightly greater than the thickness of collar 23, to provide for additional takeup required to grip an undersize shank T.

Cage wall 26 has an arcuate slot 27 in position to lap or bridge collar 23 within the adapter takeup range. As best seen in FIGS. 2 and 3, a generally arcuate pawl 28 lodges in slot 27, the pawl being hinged about pin 29 for swing on an axis parallel to that of cage 13. In cage 13 as here shown, bearing for pin 29 is most readily provided by drilling a hole lengthwise through wall 26, as indicated at 29a. At its butt pawl 28 bears on a spring 30, arranged to bias the pawl with its point 31 swung inwardly of slot 27, whereby prong 32, thus biased, lies in the space between faces 21 and 22 (FIG. 1). The inward projection of prong 32 is limited by prong 33 bearing on scarfed endwall 34 of slot 27. Slot 27 is desirably covered, as by a removable ring 35, a cover plate, or the like, so that dust, grit, or chips cannot foul the pawl or precision interior surfaces of the unit. The extreme radial depth of the pawl 28 is no greater than the thickness of wall 26, so that upon retraction of prong 32 into slot 27, the entire pawl lies within the confines of the slot.

My novel collet construction is best seen in FIGS. 4–6 inclusive. Collet 17 is completely slit lengthwise along one element, as indicated at 36, the gap being such as necessary to provide the desired contractile range. Inasmuch as the external tapers of skirt 24 and nose 25 involve a necessary variation in wall thickness, increasing from the ends toward a maximum at collar 23, the collapse resistance of the full wall section will be so great as to require an unduly high clamping pressure, thus not only requiring other parts to be heavier, but also diminishing the residual pressure available for grip. Therefore, I provide a plurality of longitudinal scores 37, dividing the collet into equal segments connected at the bases of the scores by uniformly thin segmental ribbons 38, extending substantially the full length of the collet. In cutting the scores, radial slits 39, coplanar with the scores, are cut through collar 23, so the collar has no stiffening effect along the score planes. By virtue of the low bending resistance along ribbons 38, collet 17 can be readily, uniformly contracted under relatively low axial wedging pressure, reserving a maximum portion of available clamping pressure for development of grip. The number and depth of scores will be a function of the size and proportions of the collet. For the size and proportions of the particular collet here represented I find that seven scores 37, with their bases at the same diameter as the external diameters at the collet extremities, provide desirable flexural characteristics, yet adequate strength. With slit 36, collet 17 is thus divided into eight equal segments. A collet of the same external dimensions, but smaller bore, would require deeper scoring, to provide comparable flexural characteristics. Larger or smaller collets may require more or less scores respectively.

One segment of collar 23 is flatted or scrafed to a plane land 40, approximately tangent to skirt 24 at its juncture with collar 23, defining a radial shoulder 41 extending the full collar thickness. Referring again to FIG. 3, it will be seen that collet 17 is rotarily positioned in cage 13 with shoulder 41 abutting pawl prong 32, land 40 providing clearance for engagement under bias of spring 30. When placing collet 17 in cage 13, preparatory to adapter assembly, if collet 17 is dropped in incorrect position, collar 23 will strike on the upper face of pawl point 31, preventing collet 17 from seating along interface 19, FIG. 1. In such case, insertion of lugs 14 into ring 11 will be prevented by collar 23 striking shank nose face 21, the operator being thus advised of improper collet insertion. It is then merely necessary for the operator to turn the collet until it drops into its correct position, preferably turning the collet counterclockwise, as viewed in FIG. 3, rotation being stopped by shoulder 41 striking prong 32. However, should the collet be turned clockwise past the drop position, land 40 will cam pawl 28 outward against the bias spring 30, obviating damage due to inadvertent forcing of the collet. Since only a slight spring bias is required to hold pawl 28 to engaged position, and pivotal force at prong 32 has a very large mechanical advantage over the spring counterforce, camming action involves only negligible force against land 40. Also, should maladjustment or manufacturing variances result in an excessive projection of prong 32 toward collet 17, the taper of nose 25 will cam pawl 28 without danger of jamming or scoring. As a further precaution against binding or mismatching, the inner face of pawl 28 is preferably relieved behind prong 32 by scallop 42, assuring full bearing of the prong across shoulder 41.

To release the collet from its clamped position, shown in FIG. 1, ring 11 is first backed off slightly, relieving axial clamping force. If collet 17 is in fact self-locked, only a minute movement of ring 11 toward nose face 21 will fully relieve the clamping pressure exerted by ring 11 against cage lugs 14. This motion corresponds to a very small fractional turn of ring 11, even with extra-fine threads at 12, the rotated position of slot 16 being indicated by phantom line 16a, FIG. 2. Now applying clockwise torque to cage 13, pawl prong 32 is pressed against collet shoulder 41 in a direction generally tangential to collet 17 and transmits the full torque to the collet. I have found that even without the aid of a wrench, sufficient torque is thus exerted to break the wedge lock at interface 18, whereupon the stored energy of the contracted collet will restore the latter to its free condition, releasing the tool. Further clockwise rotation of cage 13, backing ring 11 toward fully unclamped position, will assure full restoration of the collet to free condition, if necessary for reception of another tool. In the adapter here illustrated, a counterclockwise rotation of cage 13 relative to ring 11 is required to disengage, therefore no disengagement is involved in merely releasing a tool, effected by turning cage and ring clockwise, substantially together, as above described.

In my preferred collet, as shown, the taper at nose interface 19 is somewhat steeper than that of skirt interface 18. Accordingly, locking force between collet nose 25 and cage 13 will be somewhat less than that between skirt 24 and shank 10. Taking into consideration the significantly greater mass of the skirt portion, substantially more expansive energy is stored in the skirt than in the nose. These force and energy differentials are advantageous in effecting release under varying assembly conditions. For example, should the adapter be assembled with a circumferential gap between prong 32 and shoulder 41, clockwise torque applied to cage 13 is exerted on interface 19. This will be the usual condition, since there is no provision in the initial assembly for torque tending to urge the prong toward the shoulder. Breaking the taper lock involves only a minute relative rotation between the cage and the collet. Upon exertion of breaking torque, a relatively low value with respect to interface 19, cage 13 turns relative to collet 17 and thereafter prong 32 bears upon shoulder 41. Exertion of somewhat increased torque thereupon breaks the taper lock at interface 18 to effect full release. The torque differential obviates excessive twisting strain on the collet, which might otherwise result from the remoteness of centers of pressure along interfaces 18 and 19.

On the other hand, if in fact prong 32 rests firmly against shoulder 41, when clockwise torque is first exerted on cage 13, there can be no relative rotation between cage 13 and collet 17. Breaking torque is thus initially effected along interface 18. Upon breaking the lock at interface 18, the expansive energy stored in skirt 24 thus released, being greater than the lock energy in nose 25, will draw nose 25 from interface 19, effecting full release as cage 13 is further turned to move same away from shank nose face 21. At most, a light inward push on tool T may be required to complete the release. In any case, breaking torque is exerted on the collet at collar 23, in the plane of maximum collet section and maximum torsional strength. Since in practice the parts are precision finished and tapers precisely matched, the developed interface pressure is distributed along the taper. Breaking the lock will therefore be by virtually instantaneous progression from the collar along the skirt, with negligible twisting strain.

In the form of my invention described with reference to FIGS. 1–3 I show a coil spring 30, providing bias for pawl 28. However, in other sizes and/or types of adapters, holders or chucks with which my release may be employed, it may be found that space or position limitations preclude use of a coil spring for the function described. FIGS. 7 and 8, wherein parts corresponding to those of previous views are correspondingly numbered with the addition of 100 and 200 respectively, illustrate alternative means for providing bias of the pawl. In FIG. 7, pawl 128, having prong 132, pivots on pin 129, in an arrangement similar to that shown in FIG. 3. However, in this instance prong 132 is biased inward by means an elastomeric, resilient cylinder 130, of soft rubber for example, bearing on a concavity 142 in the butt of pawl 128. An opposed concavity 143 in cage wall 126 cooperates in retention of cylinder 130. A particular advantage of this arrangement is that the contact between cylinder 130 and pawl 128 is more precisely established in a zone such as to exert a pressure resultant in the position and direction of the arrow, assuring desired predetermined bias of pawl 128 in a clockwise direction about pin 129. In some instances a resilient ball may be used in lieu of cylinder 130, and in other cases a thin-walled metal tube may best serve the purpose, the choice of form and material being primarily dictated by considerations of properties best suited to particular dimensional limitations in a specific application.

In FIG. 8, pawl 228 is pivotable on pin 229 in a manner similiar to that of arrangements shown in FIGS. 3 and 7. However, spring 230 is a leaf chevron, with one leg bearing on pawl butt face 242 and the other leg bearing on land 243 in cage wall 226. Spring 230 is retained by opposed lips 242a and 243a, being sprung into position by pinching the legs 230a and 230b to pass through the opening between lips 242a and 243a. As in the arrangement of FIG. 7, the form of FIG. 8 is advantageous in localizing the contact zone for exertion of biasing pressure in the direction of the arrow.

I have throughout the drawings illustrated a particular pawl form such as pawl 28, FIG. 3. However, it will be understood that such pawl is shown only by way of illustrating a preferred form, and that other forms or variations may be employed to serve equivalent functions, without departing from the spirit of the invention. Pawl 28 is advantageous in that, as a short column, the working load thereon is primarily compressive, transmitted through the pin 29 in double shear. Bending stresses are thus avoided or minimized, facilitating the employment of parts having relatively small cross-sections, made from materials having ordinary physical properties. The preferred form and arrangement are thus well suited to meeting size, cost and other practical limitations obtaining in the manufacture of tool holders and the like.

Also, I have throughout shown my invention as applied to an adapter utilizing a double-taper collet of preferred design. It will be obvious that my invention is applicable to adapters, holders or chucks of other designs, utilizing single or double-taper collets or similar wedged gripping devices. Those skilled in the art will be able to derive from the foregoing description other forms, variations or embodiments within the spirit and scope of my invention, as defined in the claims, which are as follows:

I claim:

1. In a tool holder which includes a pair of coaxial clamping members arranged for relative axial and rotary movement and a collet therebetween, a collet release comprising: a pawl carried by one of said members, said pawl being radially biased toward said collet, and a radial projection on said collect opposing said pawl when one of said members is rotated in one direction relative to the other.

2. A collet release according to claim 1, wherein said pawl is pivotally biased.

3. A collet release according to claim 1, wherein said pawl is pivotally biased by a spring.

4. A collet release according to claim 1, wherein said pawl is pivotally biased by a spring, said collet having a surface adjacent said projection, said surface sloping outwardly away from said projection to cam said pawl in a direction opposed to said bias, when said one member is rotated in a direction opposite to said one direction.

5. A collect release according to claim 1, wherein a prong on said pawl opposes said projection, a portion of said pawl bearing on a portion of said one member to limit movement of said pawl toward said collet under said bias.

6. A tool holder comprising a shank, a caxial cage and a collet therebetween, clamp means carried by said shank, said clamp means engaging said cage to draw said cage toward said shank, said cage being rotatable relative to said shank while engaged with said clamp means, said collet engaging said shank along a conical interface when said clamp means draws said cage toward said shank, a substantially radial shoulder on said collet, and a pawl carried by said cage to oppose said shoulder when said cage is rotated in one direction relative to said shank, while said cage is engaged with said clamp means.

7. A tool holder according to claim 6, wherein said clamp means is a ring threaded to said shank.

8. A tool holder according to claim 6, wherein said pawl is pivotally biased by a spring.

9. A tool holder according to claim 6, wherein said pawl is pivotally biased by a spring, and a portion of said collet adjacent said shoulder bears on said pawl to cam said pawl in a direction opposing said bias, when said cage is rotated in a direction opposite to said one direction.

10. A tool holder according to claim 6, wherein said pawl is pivotally biased by a spring, said pawl having a prong opposing said shoulder and a portion bearing on a portion of said cage to limit movement of said prong toward said collet under said bias.

11. A tool holder according to claim 6, wherein said pawl is generally arcuate, said pawl being pivotally carried in an arcuate slot in the wall of said cage, said slot being so located axially of said cage that said pawl is in position to oppose said shoulder, when said cage is in clamping relation to said shank.

12. A tool holder according to claim 6, wherein said pawl is generally arcuate, said pawl being pivotally carried in an arcuate slot in a wall of said cage, said pawl being biased toward said collet by a spring, a portion of said collet bearing on said pawl to cam said pawl in a direction away from said collet, when said cage is rotated in a direction opposite to said one direction, the extreme radial dimension of said collet being equal to or less than the thickness of said wall, whereby said pawl is entirely confined in said wall when cammed away from said collet by said collet portion.

13. A tool adapter, or the like, comprising: a shank having a conical recess at one end thereof, a ring threaded to said shank externally thereof, a plurality of arcuate slots in said ring, a cage having portions engaged in said slots for axial and rotary movement relative to said shank when said ring is rotated relative to said shank, said cage having a conical recess, a double-tapered split collet between said shank and said cage in wedging engagement with the conical recesses thereof, said collet having a generally radial shoulder externally thereof, said shoulder lying between said shank and said cage when said cage is engaged with said ring, and a pawl carried by said cage to oppose said shoulder, when said cage is rotated in one direction relative to said shank, while said cage is engaged with said ring.

14. A tool adapter according to claim 13, wherein said pawl is pivotally biased toward its position opposing said shoulder.

15. A tool adapter according to claim 13, wherein said pawl is pivotally biased toward its position opposing said shoulder, said pawl having at its point a first prong to oppose said shoulder and a second prong opposing a portion of said cage to limit pivoting of said pawl in the direction of bias.

16. A tool adapter according to claim 13, wherein said pawl is generally arcuate, said pawl being pivotally carried in an arcuate slot through a wall of said cage, further including a prong at one end of said pawl opposing said shoulder, a bias spring at the end of said pawl remote from said prong, and a pivot pin journalling said pawl between said prong and said spring, said pin being substantially parallel to the axis of said cage and being journalled in the wall of said cage.

17. A tool adapter comprising: a shank, a cage coaxial with said shank, a split double-tapered collet between said shank and said cage, means carried by said shank and engaged with said cage to draw said collet into wedging engagement with said shank and said cage, said cage being spaced from said shank when said collet is wedged therebetween, an external collar on said collet lying in the space between said shank and said cage, a scarf in said collar defining a generally radial shoulder, and a pawl carried by said cage in an arcuate slot therethrough, said slot bridging said collar when said collet is drawn in wedging position, said pawl being pivotally biased toward said collet into position to oppose said shoulder, said cage being rotatable relative to said shank while engaged with said means, whereby rotation of said cage in one direction relative to said shank urges said pawl against said shoulder to free said collet from said shank, while rotation of said cage in a direction opposite to said one direction causes said scarf to cam said pawl in a direction away from said collar, counter to said pivotal bias.

18. A readily releasable, split, double-tapered collet with straight bore, including therein a long taper enlarging from one end of said collet, and a short taper enlarging from the other end of said collet, said tapers terminating at their crests in a relatively short collar projecting outward from said crests, said collar being scarfed along a plane substantially tangential to one of said crests to define a shoulder in a substantially radial plane.

19. A collet according to claim 18, wherein said collet is scored to substantially uniform base diameter along a plurality of longitudinal elements, said collar being slit coplanar with said scores.

20. A collet according to claim 18, wherein said collet is scored to substantially uniform base diameter along a plurality of equally spaced longitudinal elements, said collar being slit coplanar with said scores, said shoulder being coplanar with one of said slits diametrically opposite the element along which said collet is split.

21. A collet according to claim 18, wherein the degree of said short taper is substantially greater than that of said long taper.

References Cited

UNITED STATES PATENTS

| | | | |
|---|---|---|---|
| 2,449,887 | 9/1948 | Edel | 279—49 |
| 2,465,837 | 3/1949 | Benjamin | 279—52 |

ROBERT C. RIORDON, *Primary Examiner.*

E. A. CARPENTER, *Assistant Examiner.*